United States Patent [19]
Braun et al.

[11] Patent Number: 5,400,069
[45] Date of Patent: Mar. 21, 1995

[54] EYE CONTACT VIDEO-CONFERENCING SYSTEM AND SCREEN

[75] Inventors: David A. Braun, Denville; Terence J. Nelson, New Providence; Lanny S. Smoot, Morris Township, Morris County, all of N.J.

[73] Assignee: Bell Communications Research, Inc., Livingston, N.J.

[21] Appl. No.: 78,536

[22] Filed: Jun. 16, 1993

[51] Int. Cl.$^6$ ............................................. H04N 7/14
[52] U.S. Cl. ........................................ 348/20; 348/15; 359/460; 359/454
[58] Field of Search ................. 348/13, 14, 15, 16, 348/17, 18, 19, 20; H04N 7/14; 379/53, 54; 359/443, 454, 455, 456, 457, 460

[56] References Cited

U.S. PATENT DOCUMENTS

| | | | |
|---|---|---|---|
| 4,890,314 | 12/1989 | Judd et al. | 379/53 |
| 4,928,301 | 5/1990 | Smoot | 379/53 |
| 4,965,819 | 10/1990 | Kannes | 379/53 |
| 5,028,314 | 6/1991 | Tang et al. | 348/13 |
| 5,029,988 | 7/1991 | Urino | 350/347 |
| 5,050,961 | 9/1991 | Venolia | 359/465 |
| 5,113,285 | 5/1992 | Franklin et al. | 359/465 |
| 5,117,285 | 5/1992 | Nelson et al. | 348/20 |
| 5,121,343 | 6/1992 | Faris | 395/111 |
| 5,239,373 | 8/1993 | Tang et al. | 348/14 |
| 5,243,413 | 9/1993 | Gitlin et al. | 348/20 |
| 5,317,405 | 5/1994 | Kuriki et al. | 348/20 |

OTHER PUBLICATIONS

*The VideoWindow Research Prototype: An Experiment with a New Form of Audio/Video Teleconferencing,* E. J. Addeo & H. Tohme, 1992 SID Symp. Dig. of Papers, vol. 23, Playa del Ray, CA: Soc. for Information Display, pp. 927–930.

"*Improvement of Hysteresis in Polymer Dispersed Liquid Crystal (PDLC) by Control of Polymer Orientation*"E. Shimada & T. Uchida, Japan Display '92, pp. 699–702, Oct. 1992.

"*Micro–Polarizer Arrays Applied to a New Class of Stereoscopic Imaging,*" Sudeg Faris, 1991 SID Symposium Digest of Technical Papers, vol. 22, Playa Del Ray, CA: Society for Information Display, pp. 840–843.

"*3M Scotch TM Optical Lighting Film General Theory,*" Document No. 75-0299-6018-6, Nov. 1988.

"*On a Sodium Nitrate Polarization Plate of Scattering Type*" T. Yamaguti Journal of Optical Society of America, 45, 891–892 (1955).

*Primary Examiner*—James J. Groody
*Assistant Examiner*—Michael H. Lee
*Attorney, Agent, or Firm*—Leonard Charles Suchyta; Loria B. Yeadon

[57] ABSTRACT

Our video-conferencing system comprises stations which are remotely located from one another and interconnected by a transmission system. Each station includes a camera, a projector, and a screen, which is simultaneously translucent with respect to the projector and transparent with respect to the camera. The projector as well as the camera are placed behind and in line with the screen, thus allowing greater viewing reciprocity and eye-contact and projecting a stronger feeling of reality to the video-conferencing parties. Our screen includes segments which discriminates between projected light and light to be captured by the camera based upon polarization or angle.

33 Claims, 10 Drawing Sheets

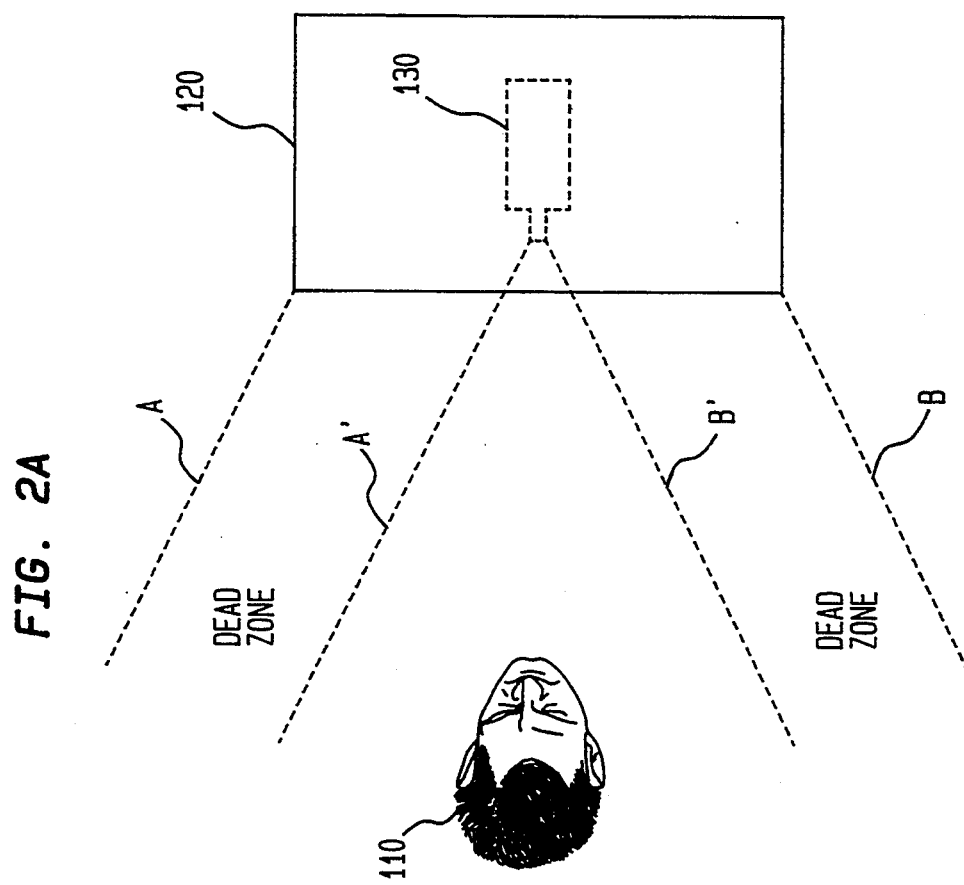

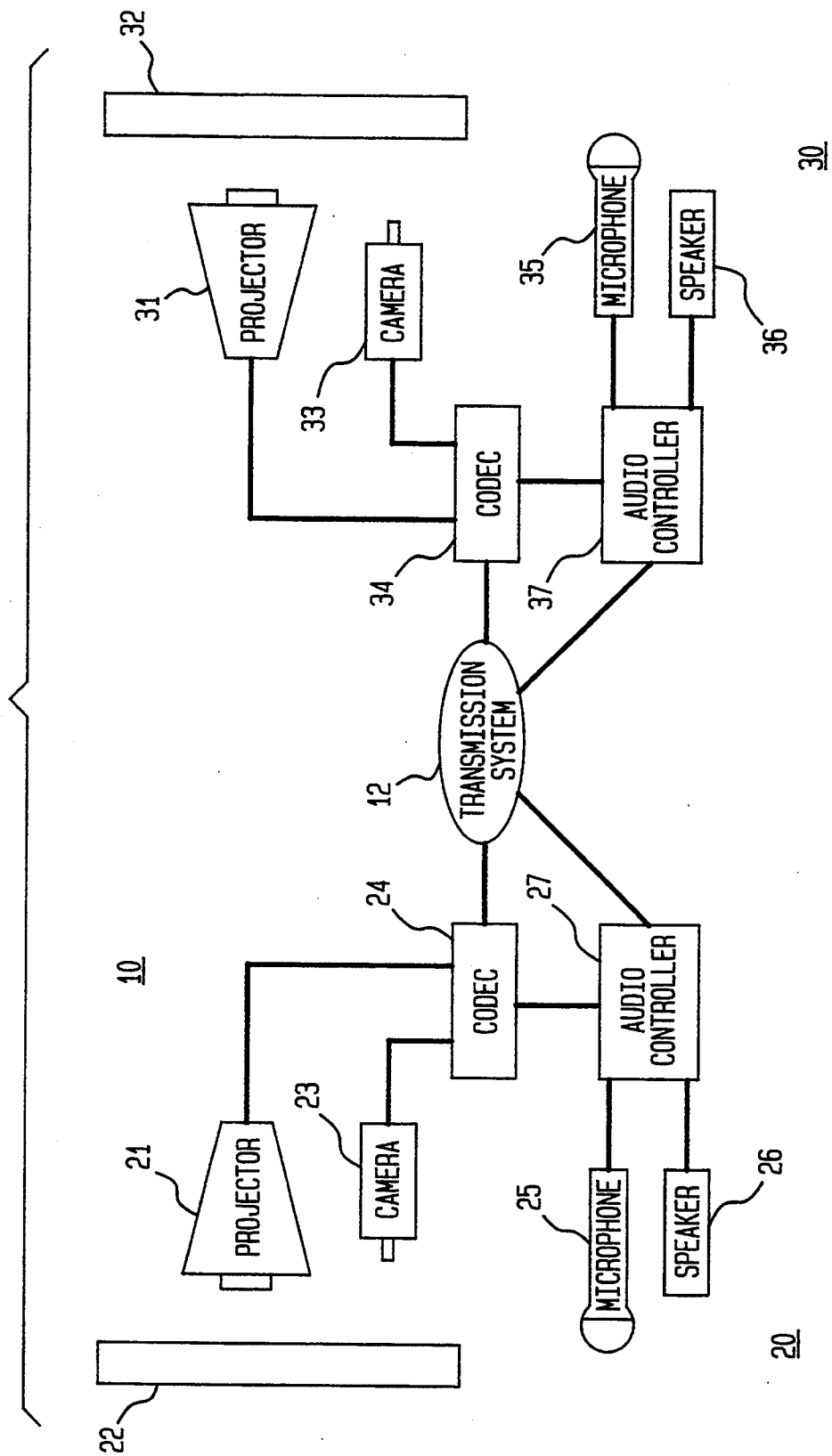

EYE CONTACT VIDEO-CONFERENCING SYSTEM AND SCREEN

RELATED PATENTS AND APPLICATION

U.S. Pat. No. 4,890,314, entitled *Teleconference Facility with High Resolution Video Display*, which issued on Dec. 26, 1989, to T. H. Judd et al., U.S. Pat. No. 5,117,285, entitled *Eye Contact Apparatus for Video Conferencing*, which issued on May 26, 1992, to T. J. Nelson et al., U.S. Pat. No. 4,928,301, entitled *Teleconferencing Terminal with Camera Behind Display Screen*, which issued on May 22, 1990, to L. S. Smoot, and U.S. Pat. No. 5,335,022, entitled *High-Contrast Front Projection Video Display System*, which issued on Aug. 2, 1994, to D. A. Braun, T. J. Nelson, and L. S. Smoot, which are all assigned to the assignee hereof, contain subject matter related to that of the present application.

FIELD OF THE INVENTION

This invention relates to a video-conferencing system for providing video communications between stations comprising a video-conferencing screen.

BACKGROUND OF THE INVENTION

Communications between distant parties have evolved with an emphasis on more personal and intimate contact between communicating parties. This emphasis is clearly noted as we observe the shift from written communications (letters and telegraphs) to voice and data communications (telephony) and on to visual communications (video-conferencing). However, even with the evolution of video-conferencing, communicants still express a need for greater intimacy.

In a typical video-conferencing configuration, the video camera and the terminal screen at a video-conferencing station are not in line with one another. Specifically, as shown in FIGS. 1A and 1B, the camera 130 is placed below or above the display screen 120, respectively. E. J. Addeo and H. Tohme, *The VideoWindow Research Prototype: An Experiment with a New Form of Audio/Video Teleconferencing*, 1992 SID Symposium Digest of Papers, Vol. 23, Playa del Rey, Calif.: Society for Information Display, pp. 927–930. Such placement of the camera diminishes eye-to-eye contact between video-conferencing parties. When the camera 130 is placed below the screen (as shown in FIG. 1A), a local video-conferencing party (local party) 110 gazing at the screen is perceived by a video-conferencing party (distant party) at distant video-conferencing station to be looking up and away from the distant party. If the camera 130 is placed above the screen (as shown in FIG. 1B), the local party 110 is perceived by the distant party to be looking down. Because the camera 130 and screen 120 are not in line with one another, the video-conferencing party is confronted with the dilemma of either facing the camera to appear attentive to the distant party or facing the screen to view the image of the distant party. Either choice under this disposition precludes eye-to-eye contact between video-conferencing parties.

In U.S. Pat. No. 5,117,285, entitled *Eye Contact Apparatus for Video Conferencing* which issued on May 26, 1992, to T. J. Nelson et al (hereafter, Patent '285), and U.S. Pat. No. 4,928,301, entitled *Terminal with Camera Behind the Screen*, which issued on May 22, 1990 to L. S. Smoot (hereafter, Patent '301), and which patents are incorporated herein by reference, the limitations associated with achieving eye-contact between parties in a video-conferencing session are discussed. Such limitations and shortcomings associated with other eye-contact schemes of the prior art often negate the intimacy and advantages gained in utilizing video-conferencing.

Placement of the camera below or above the screen as shown in FIGS. 1A and 1B also prevents the camera's field of view from overlapping with the screen's field of view as perceived by one looking through the screen. Such placement of the camera inhibits intimacy in video-conferencing and gives false visual cues because viewing reciprocity is diminished. Viewing reciprocity refers to the ability of the local party and the distant party to view one another. Therefore, viewing reciprocity exists where the local party 110 can see the distant party if the distant party can see the local party. However, if the local party and the distant party are communicating through a conventional video-conferencing system, the local party can possibly continue to view the distant party's image on the screen even when the local party moves outside of the field of view of the camera at local party's location, but the local party cannot be seen by distant party. The lack of mutual visual capability is called a reciprocity failure.

As discussed in the Backgrounds of Patents '285 and '301, in some prior eye-contact arrangements (K. Deno, *Video Conferencing System for Courtroom and Other Applications*," U.S. Pat. No. 4,965,819, Oct. 23, 1990), viewing reciprocity is limited due to the placement of the camera. When the camera is placed below the screen 120, as shown in FIG. 2A which depicts a top view of a prior eye-contact arrangement, the field of view of the camera 130 (shown in phantom) does not completely overlap the field of view of the screen as perceived by one looking through the screen. To cast a greater feeling of reality, the view captured by the camera and received by a distant party should replicate the view seen by one as if looking through a window defined by the screen 120. Therefore, the distant party should have a field of view defined by lines A and B as shown in FIG. 2. When the camera 130 has a narrower field of view as defined by lines A' and B', the distant party does not enjoy viewing reciprocity with the local party 110.

We refer to the regions between lines A and A' and between lines B and B' as "dead zones," since objects positioned within these regions cannot be captured by the camera 130 and thus cannot be seen by the distant party. Specifically, when the local party 110 unknowingly moves outside of the camera's field of view into the "dead zones," but still remains in front of the screen, the local party believes that he or she can still be seen by the distant party. This false perception results in confusion during video-conferencing and detracts from the feeling of reality that a video-conferencing system should optimally project.

Patent '301 reduces "dead zones" and casts a truer view of the video-conferencing station environs to the distant party by having the camera behind and in a line with the screen. An objective of Patent '301 is a new video-conferencing terminal design 300 (shown in FIG. 2B) employing a video projection source 302, a video camera 130, a half-silvered mirror 304, and a liquid-crystal screen 301. To have the video camera 130 in line with the screen, a special liquid crystal screen 301 is employed. By applying an excitation at a sufficient control voltage, the liquid crystal screen 301 can be rapidly switched, in time, from a transparent to a translucent state. This terminal operates in two modes: a capture mode and an image display mode. During the image capture mode, the liquid crystal screen is excited such that it is made transparent and the video camera 130 captures an in-line image of the local party 110. During the image display mode, the liquid crystal screen is made translucent and serves as a rear-projection screen to display the image of a distant party generated by the video projector source 302 and reflected by the half-silvered mirror 304.

The bi-modal operation of the liquid crystal display and the configuration of the terminal ensure eye-contact between communicating parties and also permit the camera 130 to be in line with the screen 301. However, in a video-conferencing system employing two such terminals, synchronization must be maintained between terminals in order to maintain effective communications and eye-contact.

The arrangement of Patent '301 offers substantial improvements over video-conferencing arrangements from the prior art. However, this arrangement requires a terminal with a large screen that has the capability of being rapidly switched from a transparent to translucent state by application of a suitable control voltage and also requires synchronization to achieve proper communication between terminals.

An object of Patent '285 is to provide a compact apparatus which establishes eye-to-eye contact between communicating parties without alteration to existing video-conferencing terminals and allows parties to realize more intimate communication during video-conferencing. That patent describes an apparatus to be mounted on a terminal screen, the apparatus comprising polarizers, mirrors, and a camera module positioned in front of the terminal screen. The components of that apparatus are arranged such that the overall protrusion of the apparatus from the terminal screen is minimal, thus minimizing the appearance of the display being deeply recessed into the terminal.

While the arrangement of Patent '285 offers substantial improvements over other video-conferencing arrangements from the prior art, the main focus of this patent was on compact design, and achieving ideal viewing reciprocity was not emphasized. The arrangement of Patent '285 is implementable in large-screen video-conferencing systems, however, this arrangement is most suitable and practical in systems having smaller displays, such as desk-top display screen. Implementing this arrangement in a large-screen video-conferencing system would require a large half-silvered mirror which could cause the image to appear somewhat recessed in the display.

An object of our invention is a video-conferencing system which allows greater viewing reciprocity, eliminates "dead zones," and thus promotes a feeling of "being there" among video-conferencing parties. A further object of our invention is to achieve eye-contact between parties during a video-conferencing session. Another object of our invention is an eye-contact mechanism for video-conferencing systems suitable for systems employing large-screens as well as desk-top displays. In addition, an object of our invention is a large video-conferencing screen which allows a camera positioned behind it to capture images through it as though the screen were transparent while simultaneously diffusing light from a rear projector as though the screen were translucent.

SUMMARY OF THE INVENTION

An aspect of our invention is a video-conferencing system employing our inventive screen. Our video-conferencing system comprises at least two stations which are remotely located from one another and interconnected by a transmission system. Each station includes a video projector for displaying a video image on a screen, and a video camera. The camera generates a video signal of an image captured at the station for transmission to other stations via the transmission system. The video signal generated by a camera at another station is converted into an image by the video projector for display on the screen.

In addition to a camera and a video projector, each of our video-conferencing stations also includes a unique screen which is simultaneously transparent and translucent. Our screen allows the projector as well as the camera to be placed behind and in line with the screen, thus allowing greater viewing reciprocity and projecting a stronger feeling of reality to the video-conferencing parties. Specifically, the camera is positioned in line with the screen such that it captures a view at the station as seen by one looking through the screen, and the projector is positioned such that its projected image is focused onto the screen from the rear.

With respect to the projector, the screen is translucent; therefore, upon the projected light impinging upon the screen, the light is diffused and the projected image is displayed on the screen. With respect to the camera, the screen is transparent; therefore, the camera can capture an image at the station as viewed by one looking through the screen. Distinct from the prior art, the screen is not shared in time between the camera and the projector. In our invention, the screen is simultaneously translucent with respect to the projector and transparent with respect to the camera.

The screen is simultaneously transparent and translucent since the screen employs segments which discriminate projected light and light destined for the camera based on polarization or angle. Furthermore, our video-conferencing system permits eye-contact to be achieved since the camera can be positioned behind and in line with the screen yet still capture a view through it.

An illustrative embodiment of our inventive video-conferencing screen comprises very small segments of polarizing material. The direction of polarization of one segment is substantially orthogonal to the direction of polarization of its adjacent segments. Projected light from the projector has a particular direction of polarization, and segments polarizing in that particular direction of polarization have a diffusing surface. Segments having a diffusing surfaces are referred to herein as translucent segments and adjacent segments without the diffusing surface are referred to herein as transparent segments.

Assuming that the direction of polarization of the projected light is horizontal, then the translucent segments are horizontally polarizing and the adjacent transparent segments are vertically-polarizing. Therefore, upon the projected light encountering the translucent segments, it is scattered at the diffusing surface to form a projected image on the screen. Upon encountering the transparent segments, the projected light is substantially blocked. For projectors having unpolarized light, a polarizer which polarizes light in the same direction as that of translucent segments is mounted between the projector and the screen.

The camera generates a video signal of an image captured at the station as viewed through the screen. The camera captures a view at the station by looking through the transparent segments. Since the segments are very small and closely aligned, the camera can generate an image that appears continuous and of acceptable video quality to a video-conferencing party viewing the image captured at another station. To ensure that the camera captures only an image through the screen of the video-conferencing party and his or her surroundings, a second polarizer is employed between the camera and the screen, which second polarizer protects the camera from light emitted from the projector and other unwanted light.

Another illustrative embodiment of our inventive system also maximizes viewing reciprocity and achieves eye-contact, but is based on angular techniques as opposed to techniques relating to polarization. Under this approach, the screen employs prismatic segments, and discrimination at the screen between projected light emitted from the projector and light destined for the camera is based on the angles between the projector and the screen and between the camera and the screen. Light from the projector impinging upon the flat vertical plane formed by abutting prisms is refracted and propagated to a second facet of each prism, where the projected light is again refracted. This second facet of each prism has a diffusing surface which causes the projected light to scatter and form an image for viewing at the station. The camera captures the image through a third facet of each prism.

By implementing our inventive video-conferencing system, the projector as well as the camera can be placed behind and in line with the screen, thus allowing greater viewing reciprocity and imparting a stronger feeling of reality to the video-conferencing parties. A video-conferencing party need not choose between facing the camera to appear attentive to the distant party or facing the terminal screen to view the image of the distant party since by looking into the screen, the video-conferencing party also looks into the camera. Therefore, the video-conferencing party can view the image projected onto the screen from a distant station while appearing attentive to a video-conferencing party at the distant station.

BRIEF DESCRIPTION OF THE DRAWINGS

FIG. 2A depicts, from the prior art, the field of view of a camera positioned directly below the screen as compared to the field of view of the screen as perceived by one looking through the screen.

FIG. 3 illustrates a video-conferencing system comprising at least two stations which are remotely located from one another and interconnected by a transmission system.

DETAILED DESCRIPTION OF THE INVENTION

Figure 1A:
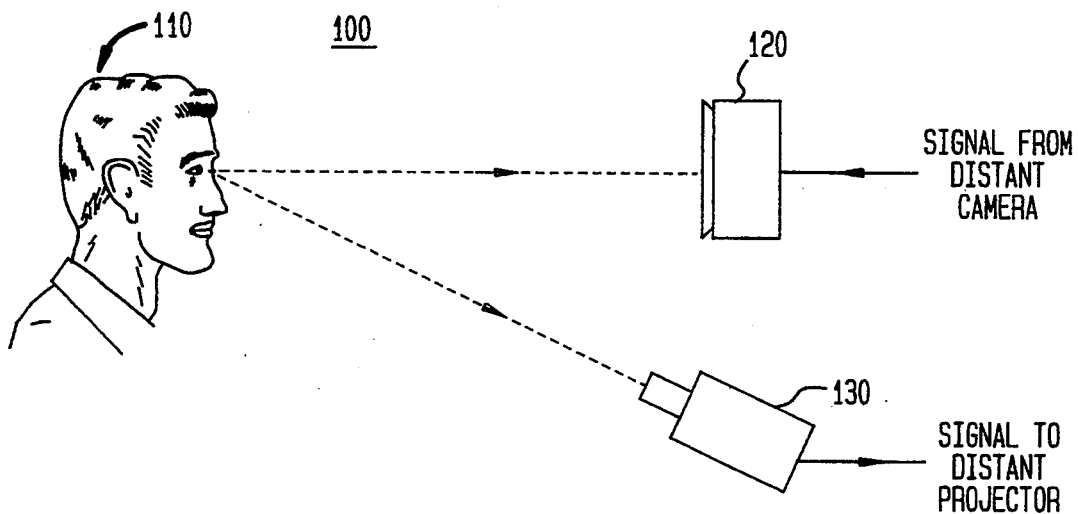
FIGS. 1A and 1B depict, from the prior art, conventional video-conferencing configurations wherein the video camera and terminal screen are not in line with one another and the camera is placed below and above the display screen, respectively.
Figure 1B:
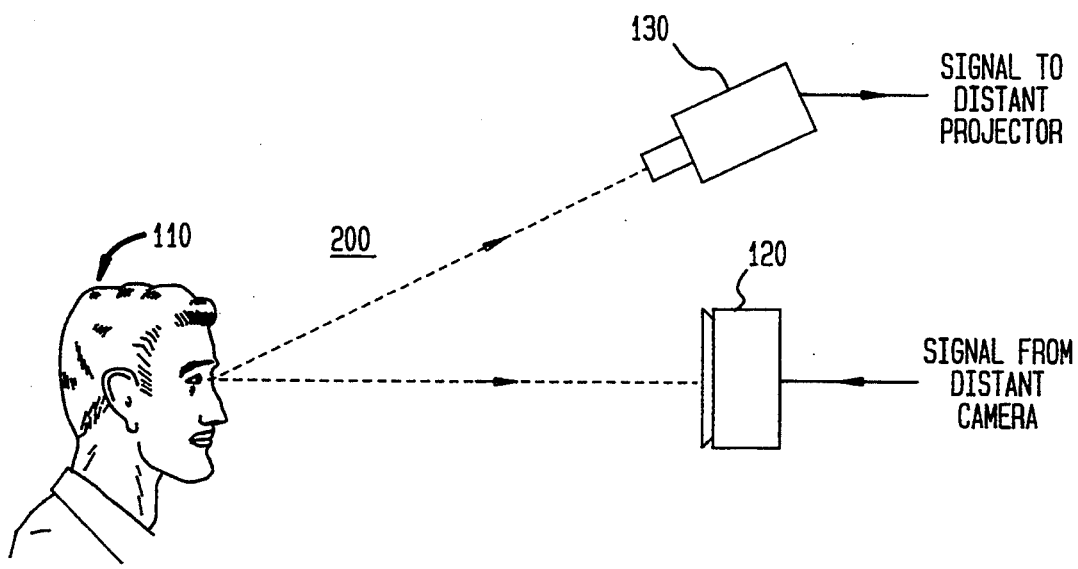
Figure 2B:
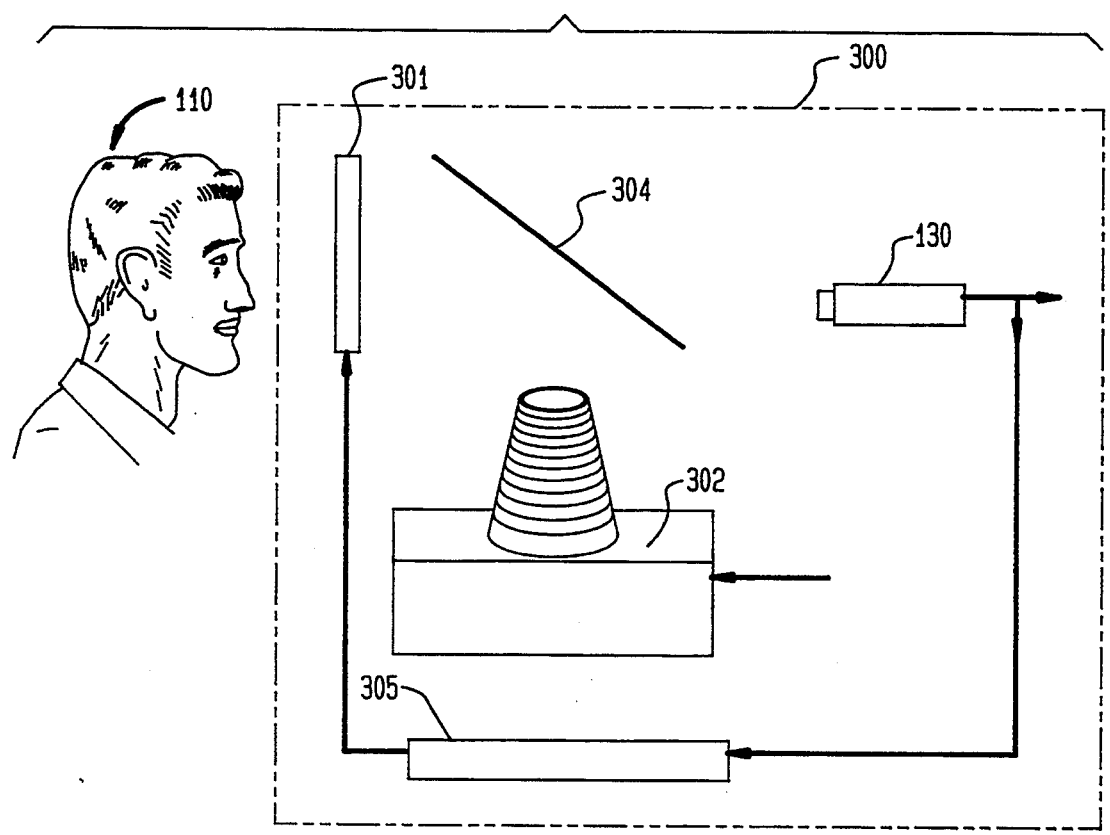
FIG. 2B depicts, from the prior art, an eye-contact arrangement employing a liquid crystal screen which switches between transparent and translucent states.

FIG. 3 illustrates a video-conferencing system with audio and video communication capabilities. The video-conferencing system 10 of FIG. 3 comprises at least two stations 20 and 30 which are remotely located from one another and interconnected by the transmission system 12. For example, the transmission system 12 may offer transmission facilities operating at DS1 or DS3 transmission rates which are North American telephone network digital transmission rates at 1.5 and 45 megabits per second, respectively.

For video communications, the station 20 includes a projector 21 for displaying a video image on a screen 22, a video camera 23, and a codec 24. Similarly, the station 30 includes a projector 31 for displaying a video image on a screen 32, a video camera 33, and a codec 34. The camera 23 generates a video signal at the station 20. The video signal generated at camera 23 is coded for compression by the codec 24 and transmitted via the transmission system 12 to the station 30. At the station 30, the video signal is decoded by the codec 34 and converted into an image by the video projector 31 for display on the screen 32. In a similar manner, the camera 33 at the station 3(}generates a video signal for display at the station 20 by the projector 21 on the screen 22. For audio communications, the station 20 includes the microphone 25, the amplified speaker 26 and the audio controller 27. Similarly, the station 30 includes the microphone 35, the amplified speaker 36, and the audio controller 37.

Figure 4A:
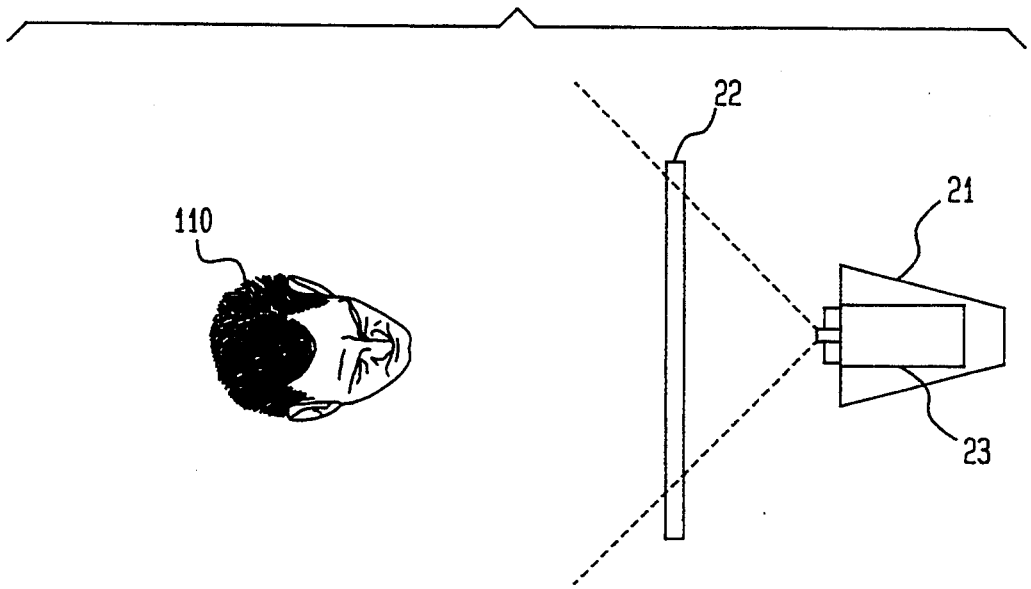
FIGS. 4A and 4B depict top and side views, respectively, of a video-conferencing station in accordance with an aspect of our invention.
Figure 4B:
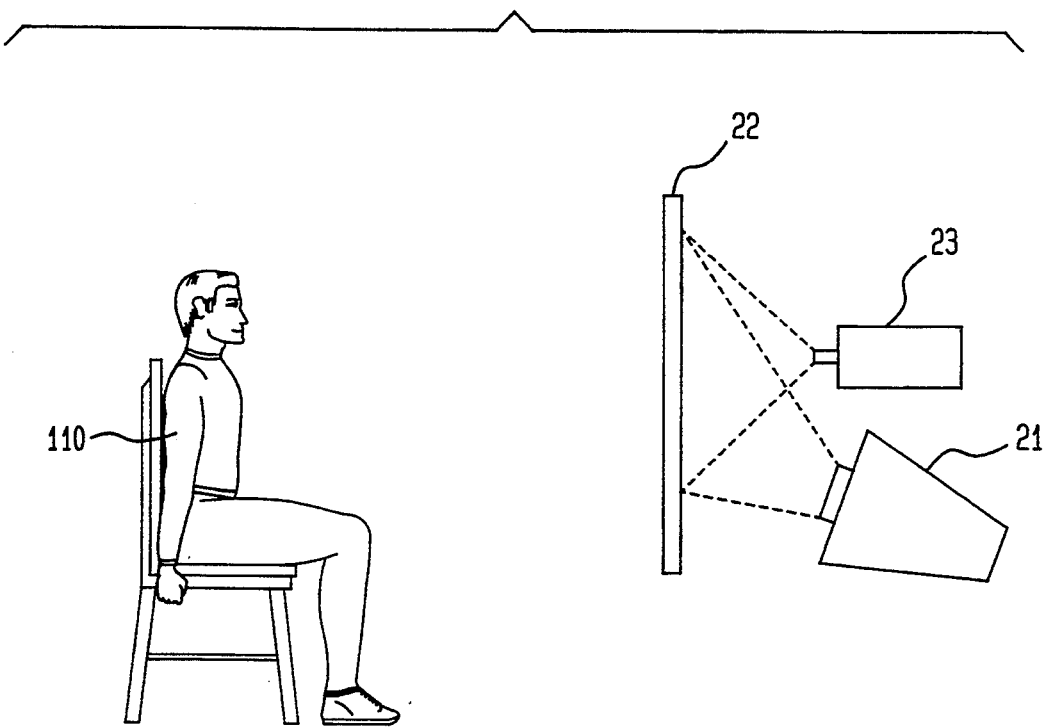

A more detailed depiction of our video-conferencing station 20, is shown in FIGS. 4A and 4B (top and side views), which station 20 comprises a camera 23, a projector 21 and a screen 22. Both the camera 23 and the projector 21 are located behind the screen 22. Furthermore, the camera 23 is aligned with the screen 22 such that it captures a view at station 20 as would be seen by an observer looking through the screen 22, and the projector 21 is aligned with the screen 22 such that its image is focused onto the screen 22 from the rear.

The projector 21 projects an image generated at a camera from another station onto the screen 22 for viewing by the local video-conferencing party 110 at station 20. With respect to the projector 21, the screen 22 is translucent; therefore, upon the projected light impinging upon the screen, the image is scattered and thus displayed on the screen 22. The camera 23 captures an image at station 20 through the screen 22 for transmission to another station for viewing. With respect to the camera 23, the screen 22 is transparent; therefore, the camera 23 captures an image at station 20 as viewed by one looking through the screen 22.

As shown in FIGS. 5A, 6, 7, and 8, our video-conferencing station may also include polarizer 31 positioned between the screen and the projector 21 and polarizer 33 positioned between the camera 23 and the screen. Polarizer 31 passes light from the projector 21 having a direction of polarization substantially parallel to its direction of polarization. Polarizer 33 has a direction of polarization that is substantially orthogonal to that of polarizer 31 and therefore, blocks light projected by the projector 21 from being captured by the camera 23.

Distinct from Patent '301, our screen is not shared in time between the camera 23 and the projector 21. In our invention, the screen 22 is specially designed to be simultaneously translucent with respect to the projector 21 and transparent with respect to the camera 23. We have developed several mechanisms to produce a screen having the characteristics of being simultaneously translucent and transparent, which are discussed below.

Figure 5A:
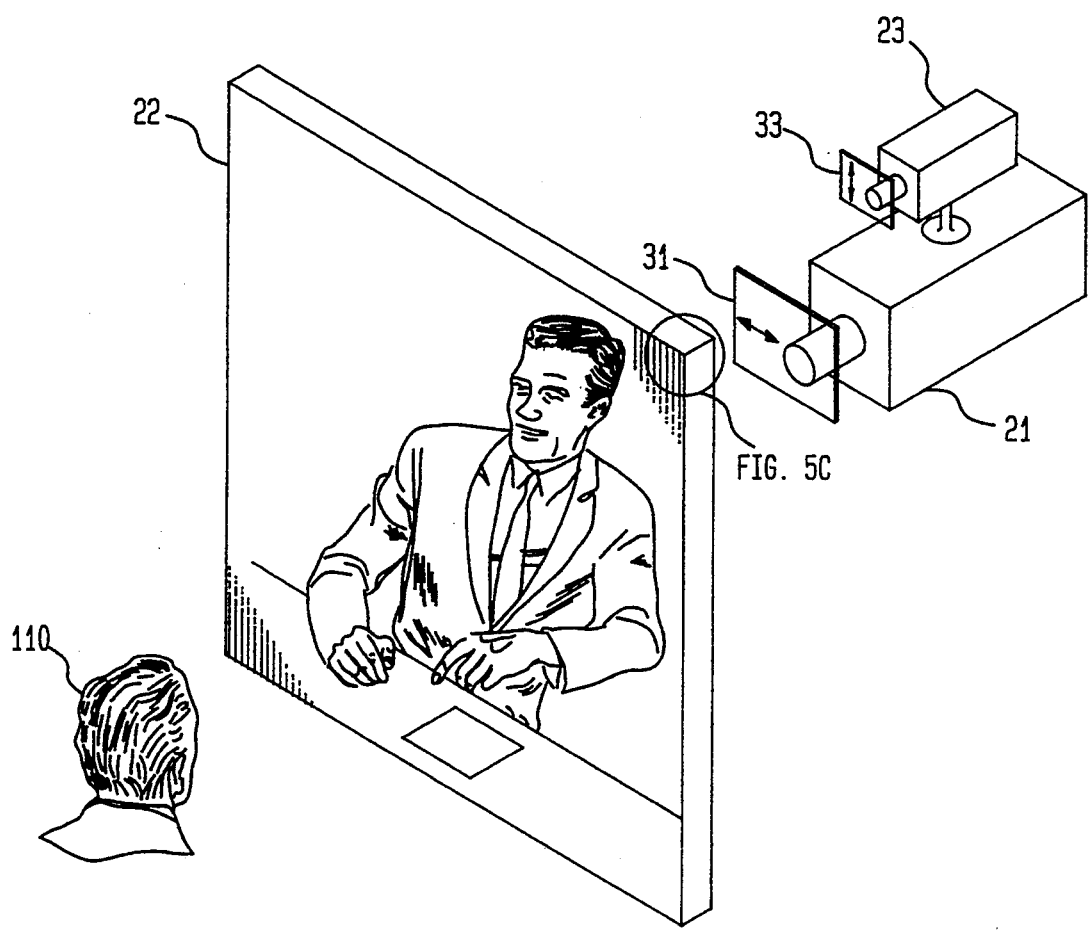
FIG. 5A shows an illustrative embodiment of our inventive video-conferencing station wherein the screen comprises narrow segments of polarizing material, and the direction of polarization of each segment is substantially orthogonal to that of adjacent segments in accordance with an aspect of our invention.

FIG. 5A shows an illustrative embodiment of our inventive video-conferencing screen 22. This illustrative embodiment of the screen 22 comprises small segments of polarizing material. FIG. 5A illustratively depicts these segments as elongated vertical strips. However, these segments could physically lie horizontally, diagonally. etc. Furthermore, the segments could be of an assortment of shapes such as, square. circular, triangular, rectangular, etc., and vary in dimensions. However, their size should be limited so as not to produce distracting visual artifacts.

Figure 5B:
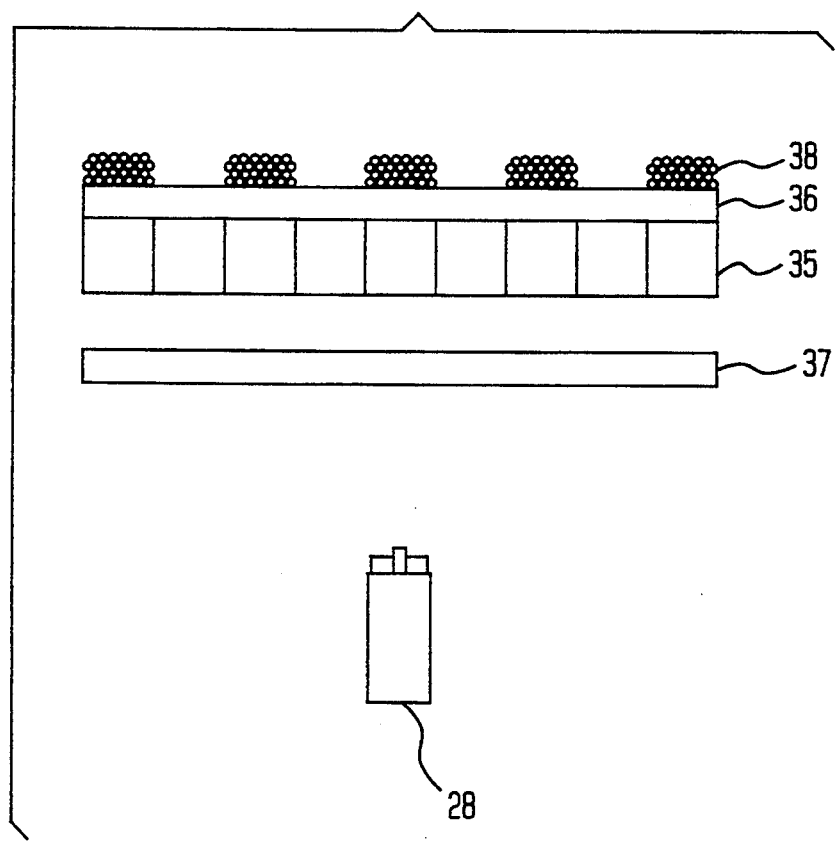
FIG. 5B illustrates the construction of an illustrative embodiment of our inventive screen using self-aligned photo processes in accordance with an aspect of our invention.
Figure 5C:
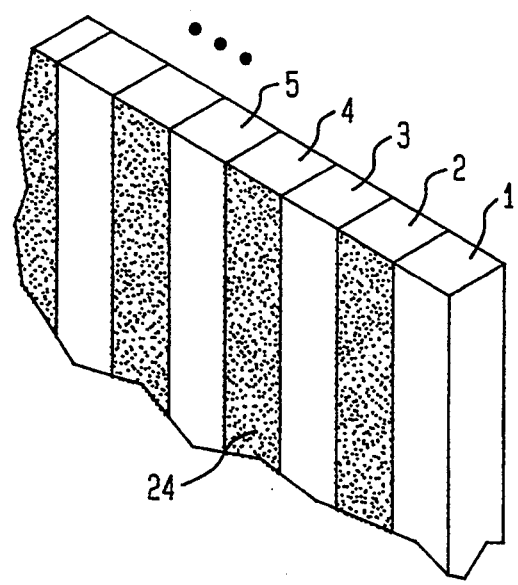
FIG. 5C depicts an enlarged view of an embodiment of our inventive screen illustratively shown in FIG. 5A, in accordance with an aspect of our invention.

The direction of polarization of one segment is substantially orthogonal to the direction of polarization of its adjacent segments. Illustratively, as shown in FIG. 5C, if segment number 1 is polarizing in the vertical direction, segment number 2 is polarizing in the horizontal direction, segment number 3 is again polarizing in the vertical direction, and so on. The segments should be sufficiently small such that the boundaries of individual segments would not be distracting to the local party 110 viewing the screen 22 or to the distant party viewing an image captured by the camera 23 through the screen 22. The width of each segment may be up to 0.5 millimeters, if the screen is to be viewed at a distance of about nine feet, which distance is typical for screens used in video-conferencing.

Segments polarizing in a direction substantially parallel to the direction of polarization of the projected light have a diffusing surface 24. Segments having a diffusing surface are referred to as translucent segments, and adjacent segments without the diffusing surface 24 are referred to as transparent segments. The diffusing surface 24 on the translucent segment can be achieved by layering a diffusing material on the surface of the segments. Alternatively, the diffusing surface 24 can be achieved by roughening the surface of the translucent segments. Due to the diffusing surface, projected light is scattered upon encountering the translucent segment, thus forming an image on the screen.

Illustratively, the diffusing surface 24 is located on the side of the translucent segments opposite the projector 21 and nearest to the local party 110 viewing the screen 22. The diffusing surface is preferably located as such because, the projected light (or other unwanted light passing through the screen from the side nearest to the local party 110) may be partially depolarized upon being scattered at the diffusing surface. Therefore, the scattered light could be passed by polarizer 33 into the camera 23. By placing the diffusing surface 24 on the side of the translucent segments opposite the camera 23, the depolarized scattered light will be blocked by the polarizing material of the translucent segment on its return trip from the diffusing surface towards the camera.

Assuming illustratively for purposes of discussion that the direction of polarization of the projected light is horizontal, then the translucent segments are horizontally-polarizing (e.g. segments 2, 4, etc.) and are adjacent to transparent segments (e.g. 1, 3, 5, etc.), which are vertically-polarizing, as shown in FIG. 5C. Therefore, upon horizontally-polarized projected light encountering the translucent segments, that projected light passes through the polarizing material of the translucent segments and the light scatters upon encountering the diffusing surface of the translucent segment to form an image on the screen 22. Upon encountering the vertically-polarizing transparent segments, the horizontally-polarized projected light is substantially blocked. As shown in FIG. 5A, from the front of the screen 22, the local party 110 at station 20 sees the projected image on the screen 22 due to the projected light being scattered at the translucent segments. The transparent segments would appear dark to the local party 110 when viewing the screen closely since these segments absorb the light projected from the projector 21.

Different types of projectors 21 may be employed in our video-conferencing system of FIG. 3, but liquid crystal display (LCD) projectors are most readily adapted for use with the screen 22 depicted in FIG. 5A since the light from LCD projectors is typically already polarized. For projectors having unpolarized light, the polarizer 31, which polarizes light in the same direction as that of translucent segments, can be mounted between the projector 21 and the screen 22. Employing polarizer 31 can also be advantageous even if the projector does emit substantially polarized light. By eliminating residual vertically-polarized light that could be emitted from the projector 21, the quality of the video-conferencing session as perceived by the local party 110 is increased.

The camera 23 generates a video signal of an image captured at station 20 as viewed through the screen 22. The camera 23 captures a view at station 20 by looking through the transparent segments. Since the segments are indiscernibly small and closely aligned, the camera 23 can capture through the screen an image of the local party and his or her surroundings that appears continuous and of acceptable video quality to a distant party viewing the image displayed at a distant station. However, at the diffusing surface 24 of the translucent segment, ambient light or projected light emitted from the projector 21 is scattered and subject to being captured by the camera 23 as it looks through the screen 22. To protect the camera from the unwanted scattered light, a polarizer 33 could be placed between the camera 23 and the screen 22. This polarizer 33 is polarizing in a direction parallel to that of the transparent segments and orthogonal to that of the translucent segments. Therefore, this polarizer 33 blocks ambient light from the station or projected light emitted by the projector 21 and scattered by the translucent segments. Because the diffusing surface 24 is on the side of the screen opposite the camera 23, the translucent segments appear dark to the camera 23 even though they are illuminated by both the projector 21 and ambient lighting at the station.

This embodiment of our inventive screen could comprise segments of polarizing material which are slit from single sheets of polarizing material, laid down next to each other, and held tightly in alignment. In this embodiment, it is especially important that the edge-to-edge alignment be maintained between the segments since any spaces between the segments will allow high intensity projected light to escape and reach the local party 110 viewing the screen. The need for perfect alignment between adjacent polarizing segments can be mitigated by other embodiments of our inventive screen, as described below.

Another embodiment of our screen employs photo-lithographically patterned polarizers. Patterned polarizers can be fabricated in a number of ways as described, for example, by Sudeg Faris, *Micro-Polarizer Arrays Applied to a New Class of Stereoscopic Imaging*, 1991 SID Symposium Digest of Technical Papers, Vol. 22. Playa Del Rey, Calif.: Society for Information Display, pp 840–843. This embodiment of the screen 22 comprises elongated segments of alternating directions of polarization similar to the aforementioned embodiment. However, in this embodiment, the screen 22 is substantially continuous without physical slits between segments. To construct a screen 22 comprising segments alternating in direction of polarization, a first continuous polarizer sheet is patterned using a photo-lithographic process.

This process produces one of the two patterned segments. The first patterned polarizer sheet can then be used as a master to pattern a second continuous polarizer sheet by a photo-lithographic process. Polarized light can be used to transfer the complement of the first pattern into the second sheet. The two sheets can then be laminated together with the self-aligned patterns adjacent to one another. A diffusing surface is formed on those segments polarizing in the direction of polarization of the projector 21 to make these segments translucent for displaying the projected image on the screen 22.

Patterned polarizers are commercially available, for example, from American Polarizers, Inc. (API) of Reading, Pa. Such polarizers are advantageous since they eliminate the possibility of gaps at the edges of the segments. These polarizers can also achieve 0.5 millimeter feature resolution which is sufficient to prevent distracting patterning of the projected image or the image captured by the camera. These patterned polarizers currently are available in fairly large sheets, typically 18" by 25", and are relatively low cost.

To form a diffusing surface on segments of the screen 22 and thus make these segments translucent, these segments can be layered with a diffusing material or roughened on the surface of the segments opposite the projector 21. Alternatively, as shown in FIG. 5B, a diffusing surface 34 can be achieved by a self-aligned photo-process. As illustratively shown FIG. 5B, under this approach, a light-curing epoxy 36 is placed on a patterned polarizer sheet 35. The epoxy 36 is exposed through the patterned polarizer sheet 35 and a linear polarizer 37 to an unpolarized light source 28. In the areas where the directions of polarization of the patterned polarizer sheet 35 and linear polarizer 37 are aligned, the light-curing epoxy 36 is hardened. In the areas where the directions of polarization are orthogonal, the light-curing epoxy 36 remains tacky. A powder of translucent crystals 38 is then applied to the surface of the curing epoxy 36. As shown in FIG. 5B, in the pre-hardened areas, no powder 38 adheres to the epoxy, but in the areas remaining tacky, the powder adheres forming a diffusing surface. The epoxy is then subjected to a final hardening under unpolarized light to fix the coating, thus forming a diffusing surface and making segments of the patterned polarizer sheet 35 translucent.

Under an alternate illustrative approach to forming a diffusing surface, an emulsion containing translucent crystals suspended in epoxy replaces the epoxy 36 and is similarly exposed through a linear polarizer 37 and the patterned polarizer sheet 35 to an unpolarized light source 28. In the areas where the direction of polarization of the patterned sheet 35 and linear polarizer 37 are aligned, the emulsion becomes hardened. In the areas where the directions of polarization are orthogonal, the emulsion does not harden. A developer solution is then used to wash away the unhardened regions of emulsion thus forming a diffusing surface and making segments of the screen translucent.

Ideally, the curing light source 28 used for illumination is located with respect to the patterned polarizer sheet 35 similar to the normal positioning of the projector with respect to the screen during video-conferencing. Specifically, the curing light source 28 is optimally positioned with respect to the patterned polarizer sheet at substantially the same distance between the projector and the screen. Furthermore, the light source 28 optimally matches the directional characteristics of the projector.

Figure 6:
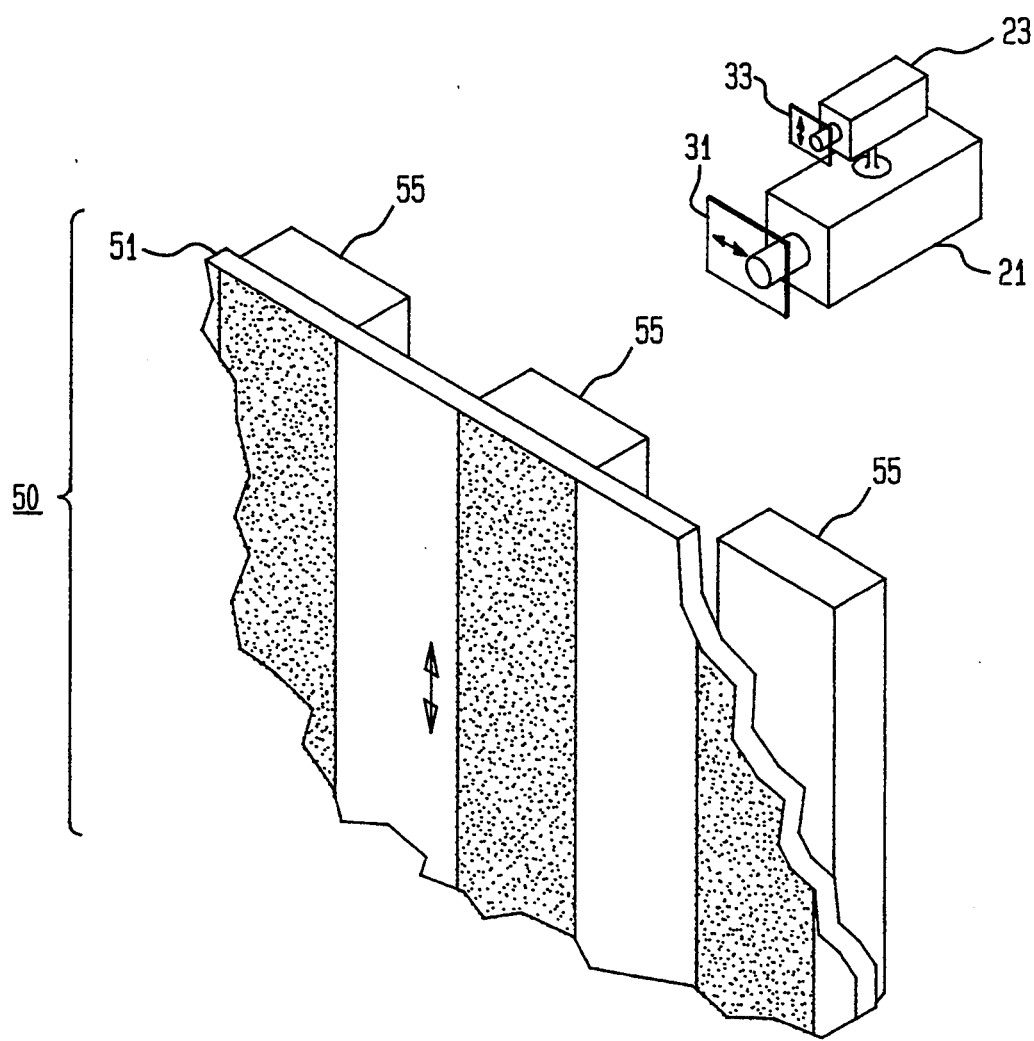
FIG. 6 depicts an alternate embodiment of our video-conferencing screen which includes a single sheet polarizer as the base layer laminated with segments of a half-wave planar phase retarder which are oriented to alter the polarization of light passing through the screen in accordance with an aspect of our invention.

The need for perfect alignment between adjacent polarizing segments also can be mitigated by the alternate embodiment of our screen 50, shown in FIG. 6, which employs a single sheet polarizer 51 as a base layer. Segments of the polarizer 51 is layered with a half-wave planar phase retarder 55, which is oriented to change the direction of polarization of traversing light from vertical to horizontal and from horizontal to vertical. Illustratively, the segments of the polarizer 51 layered with the half-wave retarder 55 are the translucent segments, and the layers without, are the transparent segments. Therefore, assuming illustratively that polarizer 51 is polarizing in the vertical direction and that projected light from projector 21 is horizontally-polarized, then the projected light impinging upon translucent segments is changed to vertically-polarized by the half-wave retarder 55 and then passed through the underlying polarizer 51, which is vertically-polarizing. Polarizers 31 and 33 are utilized as discussed above.

Projected light that directly impinges upon the polarizer 51 without the half-wave retarder 55, i.e., the transparent segment, is blocked. Furthermore, vertically-polarized light from the station is captured by camera 23 through the transparent segments, but at these segments, horizontally-polarized light from projector 21 is blocked. The half-wave retarder 55 should be located on the surface of the polarizer 51 on the same side as the projector 21 and camera 23.

Figure 7:
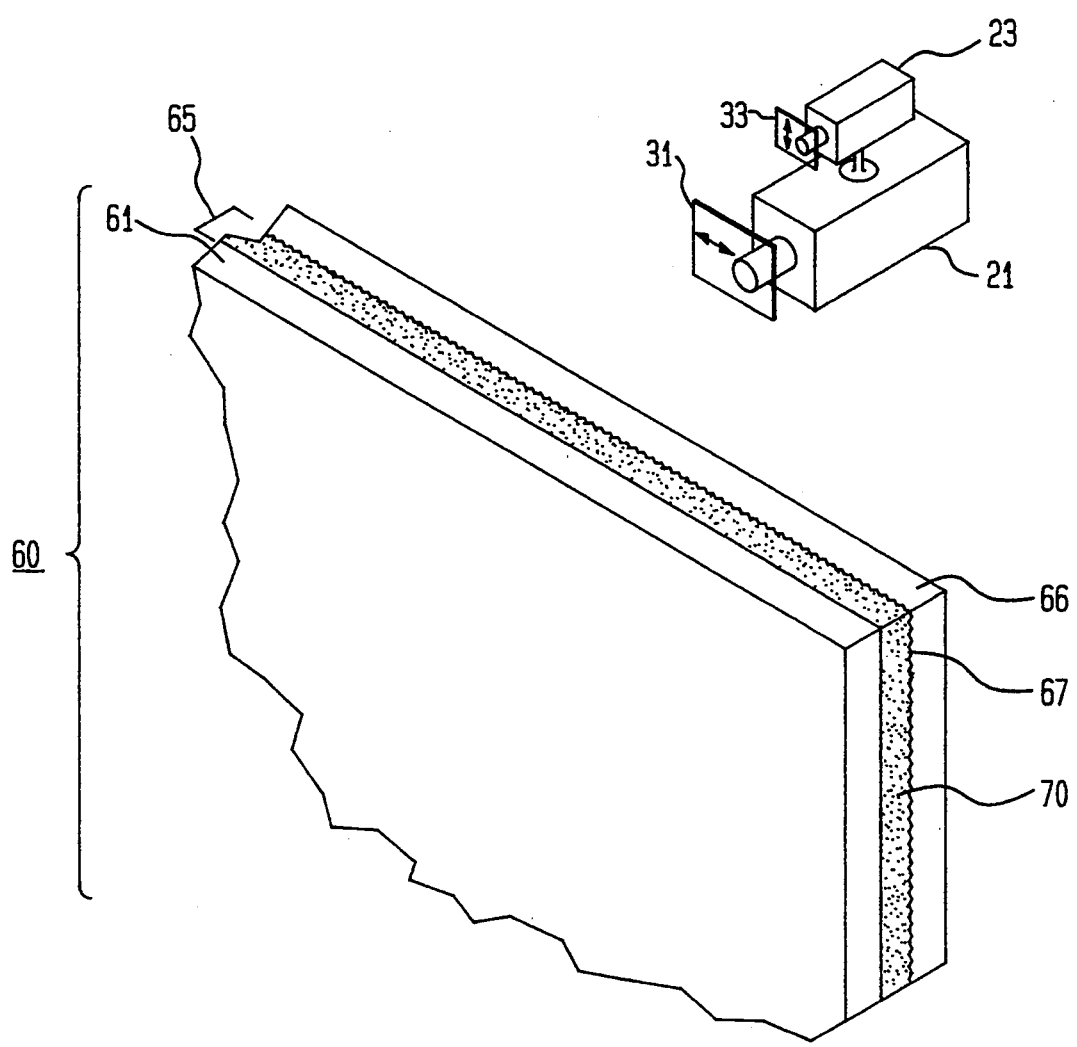
FIG. 7 displays another illustrative embodiment of our video-conferencing screen which comprises an optically isotropic sheet and a roughened birefringent sheet, in accordance with an aspect of our invention.

Whether the polarizers or the half-wave retarder are patterned, only half the area of the screen passes light to the camera and only the other half forms an image in light arriving from the projector. Furthermore, one polarization is removed from the light passing to the camera, so the camera responds as though the ambient illumination were less than 25% of its actual value. To increase the amount of light reaching the camera, another embodiment of our inventive screen 60 is shown in FIG. 7. In this embodiment, the entire screen 60 diffuses light of one polarization, while remaining transparent to light of the orthogonal polarization. Thus, one of the polarization components of the ambient light entering through every part of the area of the screen is used by the camera, and the effect on the camera is as though the ambient light were doubled.

Illustratively, in this embodiment as shown in FIG. 7, the screen 60 comprises two transparent sheets of material. One sheet is a planar, transparent, strength-member sheet 61, e.g. a non-stressed plastic which is optically isotropic. The other sheet is made of a birefringent material 66 where the index of refraction for light polarized along a first axis in the plane of the sheet is chosen to match that of the strength member. The birefringent material 66 could be fabricated from stressed plastics, liquid crystals, or other materials having substantial birefringent effects. The index of refraction for light polarized orthogonal to the first axis is made either slightly higher or lower. The surface 67 of birefringent sheet 66 adjacent to the strength member sheet 61 is roughened to allow the back-to-back assembly to act as a diffusing region 65. A layer of index-matching fluid 70 is applied at the interface between the two sheets 61 and 66 such that the fluid 70 fills the region 65 between the roughened surface 67 of the birefringent sheet 66 and the adjacent surface of the strength member sheet 61. The index of the fluid 70 is matched to the common index of light polarized along the first axis between the two sheets 61 and 66.

As in the embodiments of the screen discussed above, the camera 23 and projector 21 are located behind the screen 60, and the projector 21 is used in the rear-projection mode. Illustratively, the projected light from the projector 21 passes through the birefringent sheet 66 and then encounters the roughened surface 67. The direction of polarization of the projected light emitted from the projector 21 is aligned such that it encounters an index mismatch at the diffusing region 65. Thus, the light projected onto the screen 60 is scattered, and thereon forms an image for viewing at station 20. Polarizer 33, located between the screen 60 and the camera 23, protects the camera 23 from ambient light and projected light, which is scattered by the screen 60. Therefore, the camera 23 only receives light that did not encounter an index step at the diffusing region 65 between the strength member sheet 61 and the birefringent sheet 66. Consequently, with the respect to the camera 23, the screen 60 appears transparent, and a view of the local party and his or her surroundings through screen 60 can be captured and an image generated for transmission to another station.

Employing any of the embodiments of our inventive screen discussed above in a video-conferencing system allows the camera 23 to be in line with the screen, thus allowing greater viewing reciprocity and projecting a stronger feeling of reality to the video-conferencing parties. Furthermore, by implementing our video-conferencing system, which includes our inventive screen, eye-contact is achieved. Under our system, a video-conferencing party need not choose between facing the camera to appear attentive to the distant party or facing the terminal screen to view the image of the distant party since by looking into the screen, the video-conferencing party also looks into the camera. Therefore, the video-conferencing party can view the image projected onto the screen from a distant station while appearing attentive to the video-conferencing party at the distant station.

In the aforementioned embodiments of our inventive screen, which is employed in our video-conferencing system, projected light emitted from the projector is distinguished from light destined for the camera based on polarization. However, angular techniques can also be used to discriminate between projected light emitted from the projector to be scattered on the screen and light from within the station to be captured by the camera (camera light). Under this approach, discrimination at the screen between the projected light and the camera light is based on the angles between the projector and the screen and between the camera and the screen.

Figure 8:
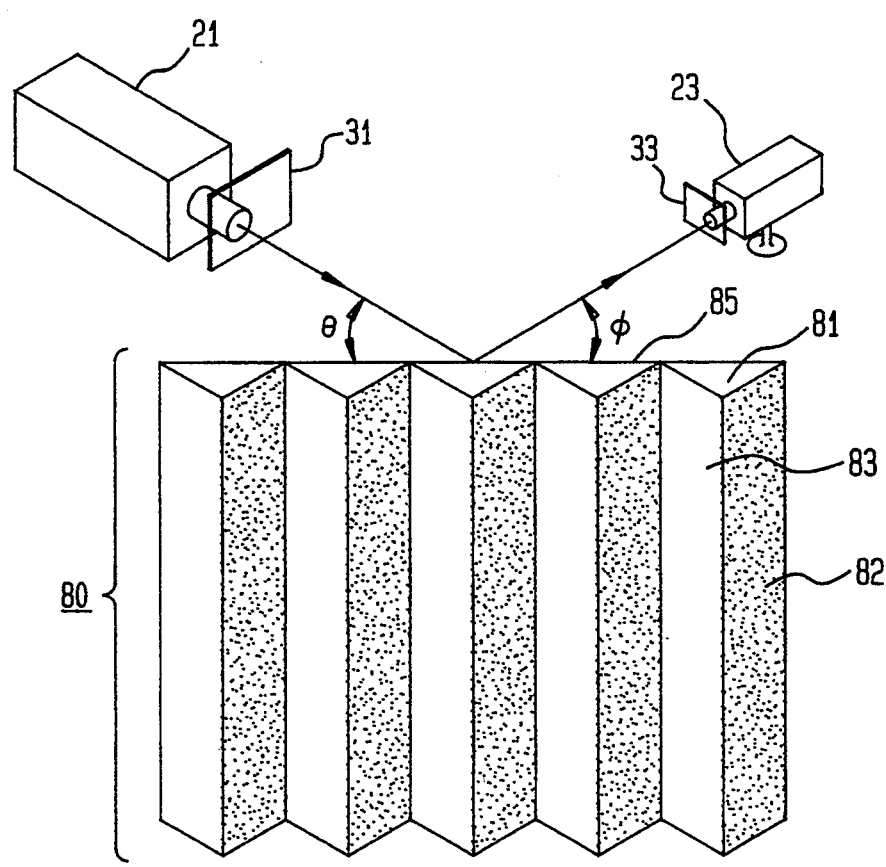
FIG. 8 depicts another illustrative embodiment of our video-conferencing screen which includes prisms in accordance with an aspect of our invention.

FIG. 8 shows a screen 80 comprising prisms 81. Illustratively, the prisms 81 run vertically and are formed on the side of the screen 80 opposite from the camera 23 and the projector 21. However, the prisms could run horizontally or diagonally without deviating from the scope of our inventive screen. A facet of each prism is abutted as shown in FIG. 8 to a facet of adjacent prisms to form a flat vertical plane 85. The projector 21 is positioned at an angle $\theta$ to the flat vertical plane 85 and the camera 23 is positioned at an angle $\theta$ to the flat vertical plane 85. The angles $\theta$ and $\phi$ are approximately 26° when the refractive index of the material of which the prisms are made is 1.5, and the prism facets 82 and 83 are formed at 45° to the flat vertical plane 85.

Light from the projector 21 impinging upon the flat vertical plane 85 is refracted and propagated to facet 82 of each prism, where the projected light is again refracted. Facet 82, which is on the side of the screen opposite from the camera 23 and projector 21, has a diffusing surface which causes the projected light to scatter and form an image for viewing at the station. The combination of facet 82 of all prisms comprises the translucent segments. The camera 23 captures an image at the station through facets 83. The combination of facet 83 of all prisms comprises the transparent segments. Light rays from the projector 21 and light rays (traced backwards) from the camera 23 bend away from each other because the facets of the prism are turned in opposite directions. Care must be taken to suppress reflections of the projected light from the fiat vertical plane 85 because when the angles $\theta$ and $\phi$ are equal the reflection will be directed towards the camera. Reflection suppression can be achieved as in other embodiments of our video-conferencing station by using polarizer 31 between the projector 21 and the screen 8 and polarizer 33 between the camera 23 and the screen 80.

Polycarbonate and acrylic sheets with 90-degree prisms molded on one side at 70 prisms per inch are commercially available for constructing this embodiment of our screen, such as Special Enterprises Program, 3M Traffic Control Materials Division, 3M Scotch TM *Optical Lighting Film General Theory*, Document No. 75-0299-6018-6, November 1988. In this embodiment, chromatic aberration, which may distort the image generated at the camera 23, can be minimized by employing a compensating sheet of lenticular prisms between the screen 80 and the camera 23. Also, it may be necessary to compensate for distortion of the image that may result from the projection of light on the screen 80 from off center. This distortion may be corrected by employing various techniques well-known in the art of projection optics.

CONCLUSION

Thus, our inventive video-conferencing system employing our inventive screen allows the projector as well as the camera to be placed behind and in line with the screen, thus allowing greater viewing reciprocity and projecting a stronger feeling of reality to the video-conferencing parties. The screen is simultaneously transparent with respect to the camera and translucent with respect to the projector since the screen employs segments which discriminate projected light and light destined for the camera based on polarization or angle. Furthermore, our video-conferencing system permits eye-contact to be achieved since the camera can be positioned behind and in line with the screen yet still capture a view through it.

What is claimed is:

1. A video-conferencing system comprising
   a plurality of stations interconnected by a transmission system, each station including
      a screen for displaying images, said screen being simultaneously transparent and translucent;
      a camera located behind said screen for generating a video signal of images captured through said screen; and
      a projector for projecting images, said projected images being diffused at, and displayed on, said screen.

2. A video-conferencing system comprising
   a plurality of stations interconnected by a transmission system, each station including
      a screen for displaying images, said screen being simultaneously transparent and translucent;
      a camera located behind said screen for generating a video signal of images captured through said screen;
      a projector for displaying projected images on said screen, and
      means located between said camera and said screen for blocking said projected images from entering said camera.

3. The video-conferencing system of claim 2 wherein said blocking means is polarizing in a particular direction of polarization and blocks said projected images having a direction of polarization substantially orthogonal to said particular direction.

4. The video-conferencing system of claim 3 further comprising polarizing means located between said projector and said screen, said polarizer means having a direction of polarization orthogonal to said particular direction and passing said projected images having a direction of polarization orthogonal to said particular direction.

5. A video-conferencing system comprising
   a plurality of stations interconnected by a transmission system, each station including
      a screen for displaying images, said screen being simultaneously transparent and translucent, wherein said screen comprises a plurality of segments of polarizing material, alternate ones of said segments being positioned adjacent to one another and having orthogonal directions of polarization;
      a camera located behind said screen for generating a video signal of images captured through said screen; and
      a projector for displaying projected images on said screen.

6. The video-conferencing system of claim 5 wherein said segments comprise translucent segments having a direction of polarization substantially parallel to the direction of polarization of said projected images and transparent segments having a direction of polarization substantially parallel to the direction of polarization of said images captured by said camera.

7. The video-conferencing system of claim 6 wherein said translucent segments include a diffusing surface for scattering said projected images from said projector.

8. The video-conferencing system of claim 7 wherein said diffusing surface is located on a side of said screen opposite said projector.

9. The video-conferencing system of claim 6 wherein said camera has a field of view and said camera is aligned with said screen such that said field of view of said camera substantially fills said screen.

10. A video-conferencing system comprising
    a plurality of stations interconnected by a transmission system, each station including
       a screen for displaying images, said screen being simultaneously transparent and translucent, wherein said screen includes
          an isotropic sheet having a first index of refraction,
          a birefringent sheet having a roughened surface, having said first index of refraction with respect to said images captured through said screen and polarized in a first direction of polarization and having a second index of refraction with respect to projected images polarized substantially orthogonal to said first direction of polarization, and
          an index-matching material between said roughened surface of said birefringent sheet and said isotropic sheet, said material having said first index of refraction, wherein upon projected images polarized substantially orthogonal to said first direction of polarization entering the screen, said orthogonally-polarized projected images encounter an index mismatch between said roughened surface of said birefringent sheet and said index-matching material and are scattered to display the projected images on the screen;
       a camera located behind said screen for generating a video signal of images captured through said screen; and
       a projector for displaying projected images on said screen.

11. A video-conferencing system comprising
    a plurality of stations interconnected by a transmission system, each station including
       a screen for displaying images, said screen being simultaneously transparent and translucent, wherein said screen includes
          a first array of segments for transmitting light through said screen and
          a second array of segments which are adjacent to and alternating with said segments of said first array, said second array of segments for diffusing light on said screen;
       a camera located behind said screen for generating a video signal of images captured through said screen; and a projector for displaying projected images on said screen.

12. The video-conferencing system of claim 11, wherein said screen comprises
a plurality of prisms which are abutting one another, each said prism having a first facet and a second facet, said first array of segments including said first facet of each said prism, said second array of segments including said second facet of each said prism, and said second facet of each said prism having a diffusing surface.

13. The video-conferencing system of claim 12, wherein said prisms are abutting to form a vertical plane, said projector and said camera being positioned at an angle of substantially 26° to said vertical plane.

14. The video-conferencing system of claim 11, wherein said first and second arrays of segments comprise parallel elongated segments of polarizing material in tight alignment with each other.

15. The video-conferencing system of claim 11, wherein said segments of said first and second arrays comprise a polarizer sheet, segments of one of said first and second arrays further having translucent crystals in conjunction with an epoxy to form a diffusing surface.

16. The video-conferencing system of claim 11, wherein said segments of said first and second arrays comprise a polarizer sheet, and one of said first and second arrays being layered with half-wave planar retarder material.

17. A video-conferencing station comprising
a screen for displaying images, said screen being simultaneously transparent and translucent;
a camera located behind said screen for generating a video signal of images captured through said screen; and
a projector for projecting images, said projected images being diffused at, and displayed on, said screen.

18. A video-conferencing station comprising
a screen for displaying images, said screen being simultaneously transparent and translucent;
a camera located behind said screen for generating a video signal of images captured through said screen;
a projector for displaying projected images on said screen;
a first polarizer, located between said projector and said screen and having a first direction of polarization, for passing said projected images from said projector which are aligned with said first direction of polarization; and
a second polarizer, located between said camera and said screen and having a second direction of polarization which is substantially orthogonal to said first direction of polarization, for blocking said projected images having said first direction of polarization from entering said camera.

19. A video-conferencing screen for use in a video-conferencing station, which includes a camera and a projector, comprising
a first set of segments having a diffusing surface for displaying an image projected from the projector; and
a second set of segments through which the camera can capture an image at the station, wherein said first set of segments are translucent with respect to the projected image and said second set of segments are transparent with respect to said captured image.

20. The video-conferencing screen of claim 19 wherein each said segment of said first set is positioned adjacent to said segments of said second sets in an alternating fashion.

21. The video-conferencing screen of claim 20 wherein said segments of said first set have a first direction of polarization and said segments of said second set have a second direction of polarization, said first direction of polarization being substantially orthogonal to said second direction.

22. The video-conferencing screen of claim 21 wherein each segment of said first and said second sets are physically distinct and laid adjacent to one another such that the segments are aligned edge-to-edge.

23. The video-conferencing screen of claim 21 wherein said first and said second sets of segments comprise a continuous polarizer sheet patterned using a photolithographic process.

24. The video-conferencing screen of claim 21 wherein said first and said second sets of segments comprise a polarizer sheet layered with half-wave planar retarder material.

25. The video-conferencing screen of claim 21 further comprising prisms having a plurality of facets wherein said first set of segments comprises a first facet of each prism and said second set of segments comprises a second facet of each prism.

26. A video-conferencing screen for use in a video-conferencing station, which includes a camera for generating a video signal of images captured through the screen and a projector for displaying projected images on the screen, comprising:
an isotropic sheet having a first index of refraction;
a birefringent sheet having a roughened surface, having said first index of refraction with respect to projected images polarized in a first direction of polarization, and having a second index of refraction with respect to projected images polarized substantially orthogonal to said first direction of polarization; and
an index-matching material between said roughened surface of said birefringent sheet and said isotropic sheet, said material having said first index of refraction, wherein upon projected images polarized substantially orthogonal to said first direction of polarization entering the screen, said orthogonally-polarized projected images encounter an index mismatch between said roughened surface of said birefringent sheet and said index-matching material and are scattered to display the projected images on the screen.

27. The video-conferencing screen of claim 26 wherein said birefringent sheet is comprised of liquid crystal material.

28. A display screen for a video-conferencing system comprising
a first array of segments for transmitting light through said screen and
a second array of segments which are adjacent to and alternating with said segments of said first array, said second array of segments for diffusing light on said screen, whereby said screen is simultaneously transparent and translucent.

29. A display screen of claim 28 wherein segments of said first array and segments of said second array have orthogonal directions of polarization.

30. A display screen of claim 29 wherein said first and second arrays of segments comprise parallel elongated segments of polarizing material in tight alignment with each other.

31. A display screen of claim 29 wherein said segments of said first and second arrays comprise a polarizer sheet, segments of one of said first and second arrays further having translucent crystals in conjunction with an epoxy to form a diffusing surface.

32. A display screen of claim 28 wherein said segments of said first and second arrays comprise a polarizer sheet and one of said first and second arrays being layered with half-wave planar retarder material.

33. A display screen of claim 28 wherein said first and second arrays of segments comprise prisms having a plurality of facets.

* * * * *